March 26, 1968   A. W. BALDWIN   3,374,762
PRESSURE INDICATOR
Filed Jan. 27, 1967

INVENTOR
ALAN W. BALDWIN

BY
   AGENT
   ATTORNEY

United States Patent Office 3,374,762
Patented Mar. 26, 1968

3,374,762
PRESSURE INDICATOR
Alan W. Baldwin, 216 Panorama Drive,
Oxon Hill, Md. 20021
Filed Jan. 27, 1967, Ser. No. 612,769
6 Claims. (Cl. 116—65)

ABSTRACT OF THE DISCLOSURE

This invention is directed to a prosthetic device usable with a mechanical artificial hand to indicate the amount of force applied to an object being held in the hand. The device includes a sensing member in the form of a compressible chamber secured on the grasping face of a mechanical thumb which forces a non-compressible fluid through a tube to an indicator which is a part of a ring placed about one of the other fingers in view of the wearer. The pressure indicator indicates the force supplied in response to the finger pressure forcing an amount of fluid from the sensing chamber to the indicator. Upon release of the item held by the mechanical hand the fluid returns to the chamber with zero pressure indication of the indicator.

---

The present invention relates to a pressure indicator device and more particularly to a sensory device for transmitting to the wearer of an artificial hand an indication of the grasping pressure used in holding an item by the hand.

Usually an amputee goes through a long tedious learning period to determine how much finger pressure must be applied in the handling of an object which results in frequent breakage of fragile objects or the dropping of heavy objects. Heretofore, a pressure sensitive device has been used wherein pressure produced by the sensor is communicated to a point on the arm wherein the amputee determines pressure on an object through sensation of the pressure on his arm. Such devices are inoperative wherein the amputee's arm has been amputated wherein there is no portion of the flesh suitable for communicating the pressure from the pressure sensing device in the hand. Thus, such prior art devices cannot be used wherein the amputee has lost substantially the entire arm. A device illustrative of the prior art is illustrated by Patent No. 2,656,545.

The device of the present invention overcomes the drawback of the above-identified patent by providing a visual feedback display of the amount of finger pressure that is exerted by a person using a mechanical artificial hand while handling objects. The visual display or indicator is activated hydraulically by means of a sensing member in the form of a liquid filled compressible chamber or balloon-like sack attached to the gripping face of the thumb of the mechanical hand. The volume change in the compressible chamber due to force thereon is transmitted to the display device by means of a small hose-like member. Thus, the fluid indication in the visual device indicates the amount of applied pressure on the sensing element which is characteristic of the pressure produced by the force of the hand on an object held thereby.

It is therefore an object of the present invention to provide a sensory mechanism for an artificial hand which is capable of transmitting to the wearer a visual indication of the degree of pressure being exerted by the hand when holding something therein.

Another object of the present invention is to provide a simple pressure indicator which may be built into an artificial hand as an integral part thereof.

Yet another object is to provide a mechanical hand pressure indicator device which is not obvious to other people in the presence of the amputee.

Still another object is to provide a visual pressure training aid which may help an amputee to better judge his required grasp for fragile as well as heavy objects.

Figure 1:
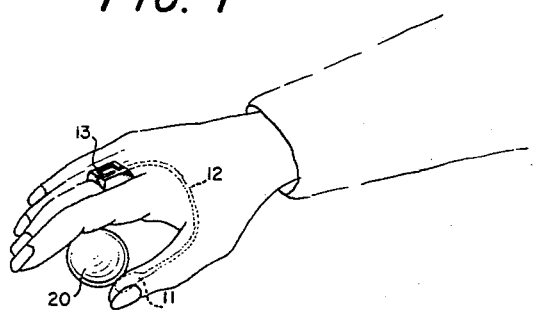
Figure 2:
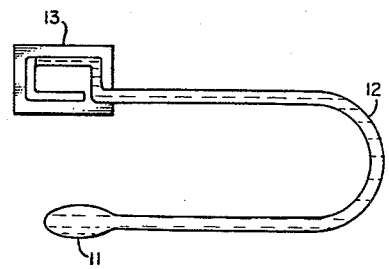

Other objects, advantages and features of the invention should become apparent from the following detailed description which is taken in conjunction with the accompanying drawing in which:

FIG. 1 illustrates the device of the present invention secured relative to an artificial hand; and FIG. 2 is a schematic view of the device separate from a hand illustrating a colored fluid therein for visual observation.

Now referring to the drawing, there is shown by illustration a visual finger pressure device made in accordance with the teaching of the present invention. As shown, the device includes a pressure chamber 11 made of pliable material. A hose-like tubular member 12 made of flexible, non-extensible material is secured at one end to the pressure chamber and at the opposite end to a visual indicator 13. The indicator, as shown, is secured to a ring 14 about the middle finger such that the indicator can be seen easily by the wearer of an artificial hand. The indicator as shown, includes a small fluid passage with the passage having the shape of an outline of the rectangle so that it will not extend over a long distance. A fluid of a desired color (as shown by FIG. 2) and type is added to the device in a closed system such that air in the indicator passage forces the fluid back into the chamber when there is no pressure on the chamber. As pressure is applied to the chamber, by holding an article in the hand, the fluid in the chamber will be forced through the tubular member into the visual indicator. The indicator is constructed such that the pressure required to force the fluid to each successive corner of the rectangular indicator is proportional to the total pressure that can be applied by the artificial hand. As the hand releases an object being held, the air in the closed system forces the fluid back into the chamber. Thus, the force applied onto an article held in the hand is indicated by the fluid position in the visual indicator.

For those individuals who already have their artificial hand, the described system may be secured to the outside of the hand with the tube connection extending along the inside of the thumb and then to the indicator ring. If the system is to be furnished with a new hand, the chamber and tubular member may be enclosed within the hand structure with the chamber free from obstruction so that pressure may be applied to the chamber as the hand is closed against an object to be held. The visual indicator is positioned on the finger or hand in a position such that it can be easily seen by the wearer.

The indicator has been described as a fluid passage in which the fluid in the passage is representative of the pressure applied to the pressure chamber. The indicator may be a plunger or other mechanical element which is movable by fluid pressure. Thus, fluid pressure will move the plunger a distance representative of the pressure on the pressure chamber. Such a mechanical device would be more complicated requiring a spring or some other means to return the mechanical element back to its original starting point with no pressure on the pressure chamber.

If desired a separate pressure chamber or bulb and indicator may be used with each finger so that pressure applied to each of the fingers may be measured.

In operation of the device, the chamber and indicator are assembled with the tubular member in between and filled with a fluid such that the fluid is contained within the chamber and tubular member. The hand is operated to apply force to an object such that the object can be picked up. As a force is applied to the object, the force is also applied to the fluid chamber which accordingly forces a portion of the fluid into the indicator. As more pressure is applied to the object being held, more fluid is forced from the chamber into the indicator. Thus, as more pressure is applied to the fluid filled chamber displacing the fluid, the fluid enters into the visual indicator thereby indicating the amount of pressure being applied to the object.

The indicator device has been shown as a ring on one of the fingers so that it will have a neat appearance. Therefore, the indicator device will not be conspicuous to those who observe the wearer's hand. Obviously the indicator could be secured any place with respect to the thumb such that the wearer could observe the fluid or an element moved by fluid pressure.

A device such as disclosed herein is very important to an amputee especially during the tedious learning period required when first using an artificial hand. Once an amputee has gained experience and has become accustomed to an artificial hand he will not depend on the indicator as much as during a training period. Therefore, such a device is very valuable during the training period and will save many embarrasing situations for an amputee.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed and desired to be secured by Letters Patent of the United States is:

1. A visual display device for indicating to a wearer, by visual observation, the pressure exerted by a hand-like artificial hand to an object held therein between one or more fingers, which comprises, a pressure chamber secured relative to one of said fingers and so positioned to press against an object being held by said hand,
   said pressure chamber containing a fluid therein,
   a visual indicator means, having a passage with a closed end and an open end and secured onto said artificial hand within eye sight of said wearer, and
   a fluid communicating means secured to said open end passage in said indicator means and extending between said pressure chamber and said visual indicator means for communicating a fluid from said pressure chamber to said visual indicator means according to the pressure exerted onto said pressure chamber by said fingers whereby,
   the pressure exerted by the hand is visually indicated by fluid that is forced into said visual indicator from said pressure chamber.

2. A visual display device as claimed in claim 1, wherein:
   said pressure chamber is located on the thumb of said artificial hand.

3. A visual display device as claimed in claim 2, wherein:
   said fluid communicating means is on the outer surface of said hand.

4. A visual display device as claimed in claim 2, wherein:
   said fluid communicating means and said pressure chamber is within said hand structure.

5. A visual display device as claimed in claim 1, wherein:
   said visual indicator includes a fluid path of rectangular shape.

6. A visual display device as claimed in claim 5, wherein:
   said indicator fluid path is formed in the set of a ring on one of the fingers of the artificial hand in order to make the indicator unobvious to others when viewing the hand.

References Cited
UNITED STATES PATENTS

| | | | |
|---|---|---|---|
| 482,623 | 9/1892 | Dooling | 73—379 |
| 750,593 | 1/1904 | Cady | 73—379 |
| 2,567,066 | 9/1951 | Goldman | 116—114 |
| 2,582,234 | 1/1952 | Conzelman et al. | 73—379 |
| 2,919,135 | 12/1952 | Marcheonda | 272—68 |

LOUIS J. CAPOZI, *Primary Examiner.*